Sept. 29, 1964  D. F. FRANCK ETAL  3,150,638
SELF-CLEANING WATER FOUNTAIN
Filed July 30, 1962  3 Sheets-Sheet 1
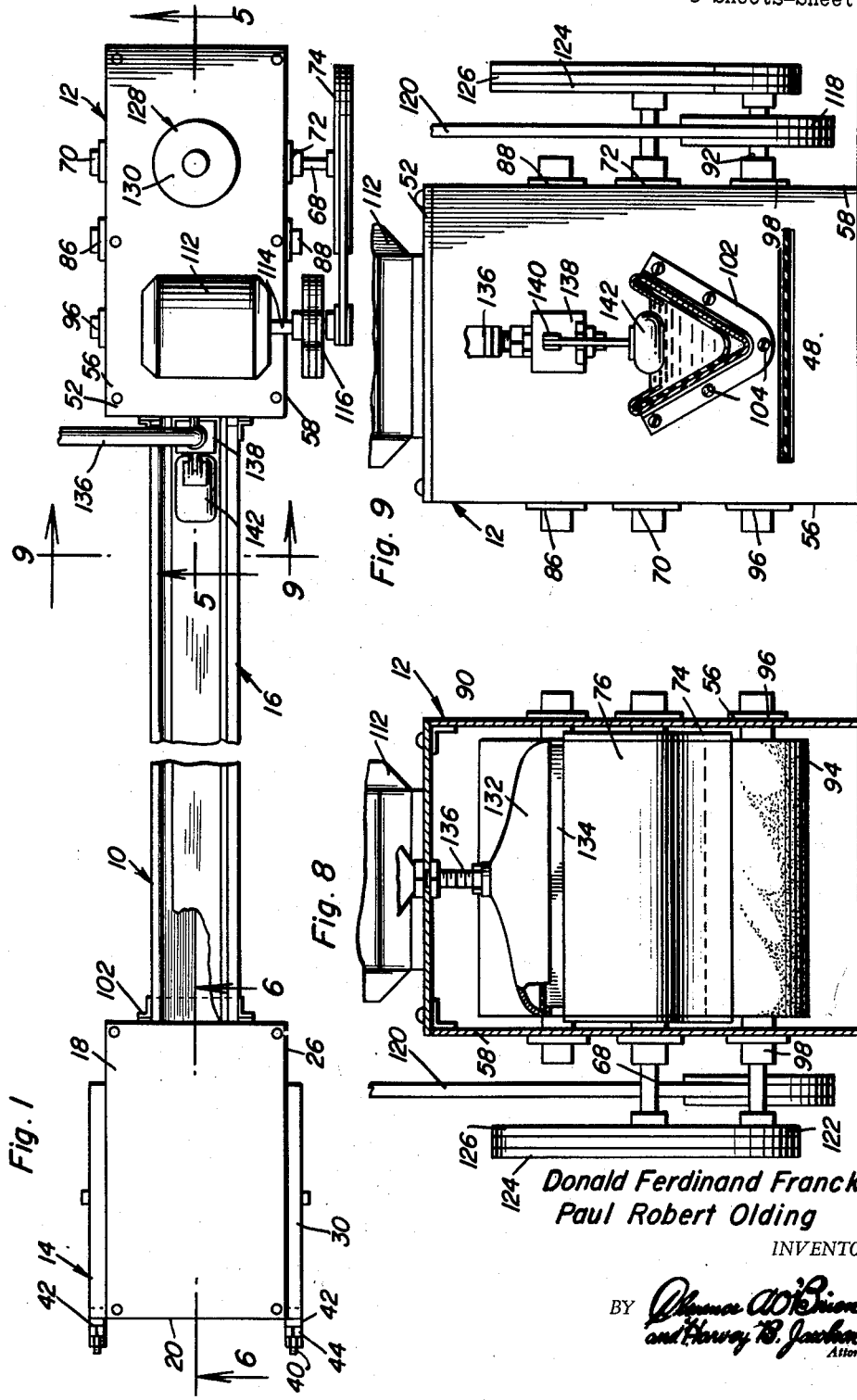
Donald Ferdinand Franck
Paul Robert Olding
INVENTORS Sept. 29, 1964 D. F. FRANCK ETAL 3,150,638
SELF-CLEANING WATER FOUNTAIN
Filed July 30, 1962 3 Sheets-Sheet 2
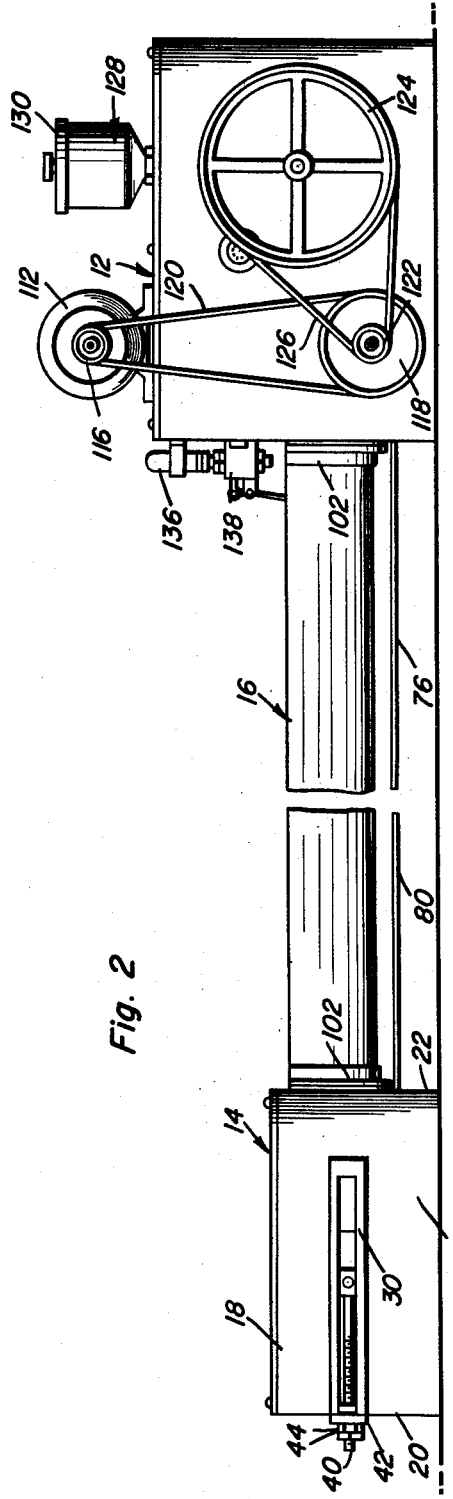
Donald Ferdinand Franck
Paul Robert Olding
INVENTORS
BY
Attorneys Sept. 29, 1964  D. F. FRANCK ETAL  3,150,638
SELF-CLEANING WATER FOUNTAIN
Filed July 30, 1962  3 Sheets-Sheet 3
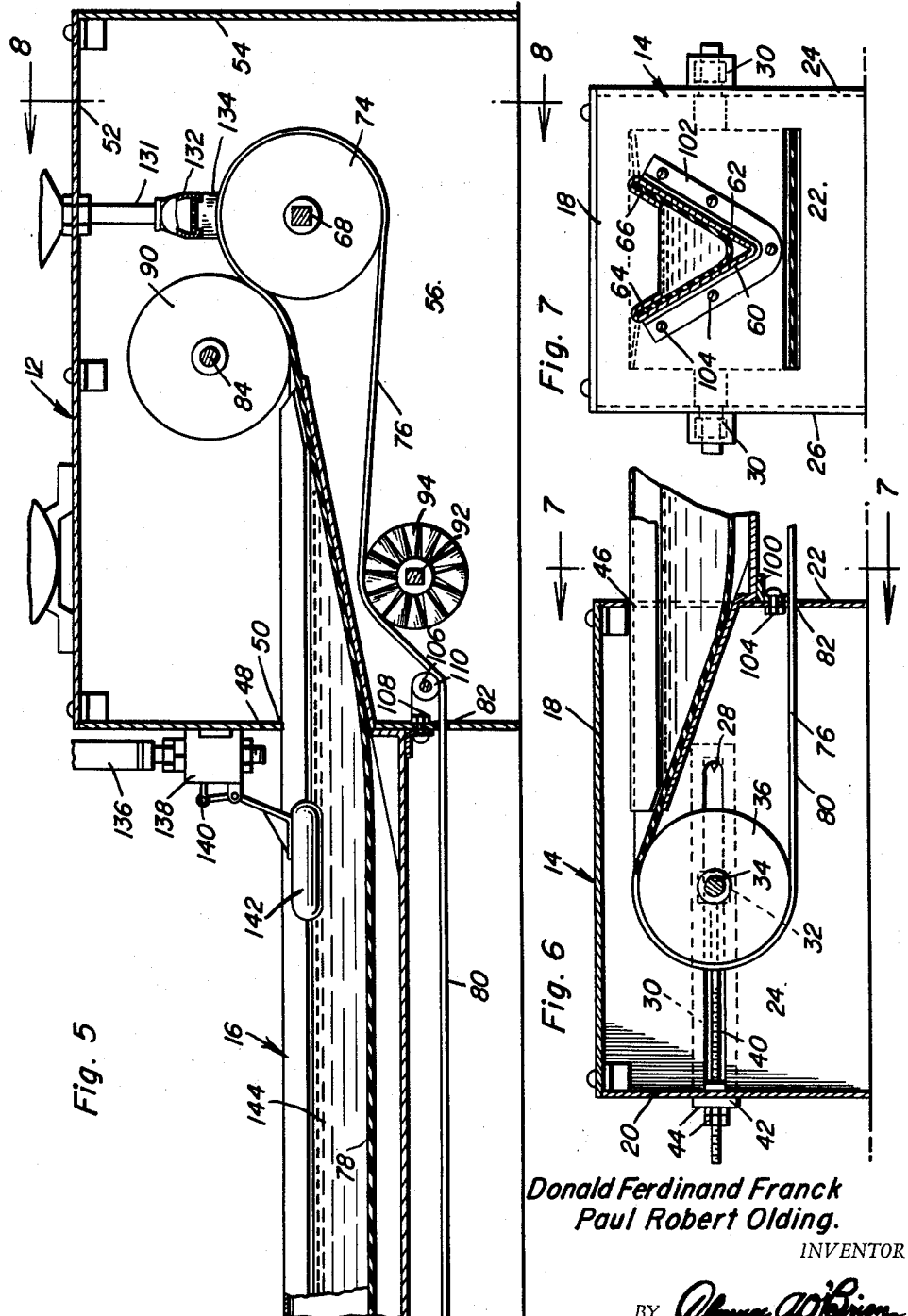
Donald Ferdinand Franck
Paul Robert Olding.
INVENTORS United States Patent Office 3,150,638
Patented Sept. 29, 1964

3,150,638
SELF-CLEANING WATER FOUNTAIN
Donald Ferdinand Franck, Jay County, Ind., and Paul
Robert Olding, Fort Recovery, Ohio (both of R.R. 3,
Fort Recovery, Ohio), assignors of thirty-three and one-
third percent to Robert C. Oliver, Winchester, Ind.
Filed July 30, 1962, Ser. No. 213,419
15 Claims. (Cl. 119—72)

This invention relates to a novel and useful self-cleaning water fountain and more specifically to a water fountain primarily designed to provide a constant supply of clean uncontaminated water in a poultry house.

Although chickens and the like require considerable quantities of water, if a watering trough is provided and the water supply therein is maintained, chickens display very little natural instinct to keep the water within the watering trough clean. Chickens will invariably perch on the edges of a watering trough which sometimes results in chicken droppings falling into the watering trough. Chickens will walk through the watering trough and in geenral display very little concern as to whether or not their water supply becomes contaminated.

As it is the opinion of many persons in the poultry industry that the high mortality rate among fowl is directly attributable to the unclean water drunk by the poultry from unsanitary water fountains and troughs. It is the main object of this invention to provide a self-cleaning water fountain which may be used to great advantage in poultry houses.

Another object of this invention is to provide a self-cleaning water fountain provided with a means whereby a constant supply of water may be maintained.

A still further object of this invention is to provide a self-cleaning water fountain constructed of an endless rubberized or other type of water impervious belt entrained about two laterally spaced and horizontally disposed rollers with guide means engaged with the upper reach of the belt in order to laterally deflect the belt along its longitudinal center line throughout a portion of the upper reach thereof thereby forming an upwardly opening trough whose bottom and side walls are constantly in motion and which includes upwardly divergent end wall portions defined by the end portions of the upper reach of the belt disposed between the guide means and the rollers about which the belt is entrained.

A further object of this invention, in accordance with the immediately preceding object, is to provide a belt cleansing apparatus in the form of a scrubbing roller disposed so as to scrubbingly engage the outer surface of the belt as the latter is driven longitudinally about the support rollers. In this manner, the surfaces of the belt which form the upwardly opening trough are constantly scrubbed and maintained clean of any foreign deposits.

Still another object of this invention, in accordance with the immediately preceding objects, is to provide a disinfectant applicator mounted in relation to the belt scrubbing appaartus so as to apply disinfectant to the outer surfaces of the belt after the belt has passed the scrubbing station.

Another object of this invention is to provide a self-cleaning water fountain in accordance with the preceding objects including water supply means adapted to be operatively connected to a source of water under pressure and including float-actuated control valve means whereby the water level within the trough defined by the upper reach of the belt may be maintained constant.

Still another object of this invention, in accordance with the preceding objects, is to provide a means for mounting the support rollers for relative lateral adjustment whereby the tension of the endless flexible belt may be adjusted.

A final object to be specifically enumerated herein is to provide a self-cleaning water fountain in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of the self-cleaning water fountain with portions thereof being broken away;

FIGURE 2 is a side elevational view of the embodiment illustrated in FIGURE 1;

FIGURE 3 is an end elevational view as seen from the left side of FIGURE 2;

FIGURE 4 is an end elevational view as seen from the right side of FIGURE 2;

FIGURE 5 is an enlarged fragmentary vertical sectional view taken substantially upon the plane indicated by the section line 5—5 of FIGURE 1;

FIGURE 6 is an enlarged fragmentary longitudinal vertical sectional view taken substantially upon the plane indicated by the section line 6—6 of FIGURE 1;

FIGURE 7 is a vertical transverse sectional view taken substantially upon a plane indicated by the section line 7—7 of FIGURE 6;

FIGURE 8 is a fragmentary vertical transverse sectional view taken substantially upon the plane indicated by the section line 8—8 of FIGURE 5; and FIGURE 9 is an enlarged fragmentary vertical transverse sectional view taken substantially upon the plane indicated by the section line 9—9 of FIGURE 1.

Referring now more specifically to the drawings, the numeral 10 generally designates a self-cleaning water fountain of the instant invention. The water fountain 10 includes a pair of housings 12 and 14 between which an elongated guide assembly generally referred to by the reference numeral 16 is mounted.

The housing 14 includes a top wall 18, opposite end walls 20 and 22 and opposite side walls 24 and 26. Each of the opposite side walls 24 and 26 has an elongated slot 28 formed therein and each has an elongated slotted guide 30 mounted thereon which is in registry with the corresponding slot 28.

A pair of journal blocks 32 are slidingly disposed in each guide 30 and the journal blocks 32 rotatably receive the opposite ends of a cross shaft 34 on which there is mounted a roller 36. The journal blocks 32 each have one end of an adjusting screw 40 secured thereto and the other end of each adjusting screw 40 is passed through an apertured end wall 42 carried by the associated guide 30 and has a pair of retaining nuts 44 threadedly engaged therewith. Accordingly, upon tightening of the nuts 44 on each of the adjusting screws 40, the cross shaft 34 may be moved away from the housing 12 for a purpose to be more fully hereinafter set forth.

The end wall 22 has an opening 46 formed therein and it may be seen that the confronting end wall 48 of the housing 12 is also provided with an opening which is referred to by the reference numeral 50. The housing 12 also includes a top wall 52, a second end wall 54 and opposite side walls 56 and 58. The guide assembly 16 is elongated and is generally V-shaped in cross section and includes a pair of upwardly divergent legs 60 and 62. The upper ends of each of the legs 60 and 62 are turned back upon themselves as at 64 and 66 to form retaining flanges, which together with the upper ends of the legs 60 and 62, respectively, form downwardly opening pockets.

A support shaft 68 has its opposite end portions journaled by means of bearing journals 70 and 72 secured to the opposite side walls 56 and 58 of the housing 12 and a driven pulley 74 is fixed to the end of the support shaft 68 projecting outwardly of the side wall 58. A roller 75 is fixed to the shaft 68 and an endless rubberized water impervious belt 76 is entrained about the roller 75 and passes through the openings 46 and 50 formed in the housings 12 and 14, respectively. The belt 76 includes an upper reach 78 and a lower reach 80 and it may be seen that each of the end walls 22 and 48 also includes a second opening 82 through which the lower reach 80 of the belt 76 is slidingly received.

An idler shaft 84 has its opposite ends rotatably journaled in bearing journals 86 and 88 secured to the outer surfaces of the opposite side walls 56 and 58, respectively, and an idler roller 90 is mounted on the shaft 84.

A support shaft 92 has a scrubbing brush roller 94 secured thereto and the opposite ends of the shaft 92 are rotatably journaled in bearing journals 96 and 98 mounted on the outer surfaces of the opposite side walls 56 and 58, respectively, of the housing 12.

The opposite ends of the guide assembly 16 are secured to the end walls 22 and 48 of the housings 12 and 14, respectively, by means of brackets 100 and 102 which are secured to the end walls 22 and 48, respectively, by means of fasteners 104.

A support shaft 106 is supported in horizontal alignment with the slot or opening 82 formed in the end wall 48 by means of brackets 108 and has a roller 110 rotatably journaled thereon under which the lower reach 80 of the belt 76 passes and before passing over the scrubbing roller 94 and about the drive roller 75.

An electric motor 112 is secured to the top wall 52 of the housing 12 and includes a power output shaft 114 on which there is mounted a drive pulley 116. The drive pulley 116 is disposed in alignment with a driven pulley 118 carried by the shaft 92 and the pulleys 116 and 118 are drivingly connected by means of an endless flexible belt 120. A drive pulley 122 is also secured to the shaft 92 and is aligned with a driven pulley 124 secured to the support shaft 68 and is drivingly connected to the driven pulley 124 by means of an endless flexible belt 126. In this manner, the power output shaft 114 is drivingly connected to the drive roller 75.

A disinfectant reservoir generally referred to by the reference numeral 128 and including a removable top 130 is also secured to the top wall 52 of the housing 12 and includes an outlet neck portion 131 which projects downwardly through the top wall 52 and is provided with an outlet nozzle 132 with which a wick-type applicator 134 is operatively associated. The wick-type applicator 134 is disposed in sliding contacting relation with the outer surfaces of the endless flexible belt 76 and is utilized to apply disinfectant from the reservoir 128 on the outer surfaces of the belt 76.

Inasmuch as the scrubbing roller 94 is disposed in scrubbing engagement with the outer surfaces of the belt 76, all foreign material clinging to the belt 76 will be scrubbed therefrom before the disinfectant from the reservoir 128 is applied thereto.

A water conduit 136 has its outlet end operatively connected to a control valve 138 supported from the end wall 48 of the housing 12 and the control valve 138 includes a movable actuator 140 with which a float assembly 142 is operatively associated. The float 142 is utilized to move the actuator 140 to a position with the control valve shutoff when the float is raised and to move the actuator 140 to a position with the control valve 138 open when the float 142 is lowered.

The end of the conduit 136 remote from the control valve 138 is adapted to be connected to a suitable source of water under pressure and it may be seen from FIGURES 5 through 9 of the drawings that as the belt 76 moves in the direction of the arrows in FIGURES 5 and 6 that it will first, upon entering the housing 12, pass under the roller 110, over the scrubbing roller 94, about the drive roller 75, underneath the wick-type applicator 134 and then under the idler roller 90 before entering the adjacent end of the elongated guide assembly 16. Upon entering the guide assembly 16, the belt 76 is downwardly deflected along its longitudinal center line until it is substantially V-shaped in cross-section forming an upwardly opening trough with the opposite edges of the belt slidingly received in the downwardly opening pockets formed by the legs 60 and 62 of the guide 16 and the corresponding backturned end portions 64 and 66, respectively.

As the belt 76 passes from the end of the elongated guide assembly 16 secured to the housing 14, it moves upwardly and over the roller 36 before again moving toward the housing 12 and passing outwardly of the opening 82 formed in the end wall 22 of the housing 14. If it is desired to increase the tension of the belt 76, the cross shaft 34 may be moved away from the support shaft 68 by tightening the nuts 44 on the adjusting screws 40.

Water from the conduit 136 and being discharged from the control valve 138 falls into the upwardly opening trough formed by the upwardly inclined and divergent outside marginal portions of the upper reach 78 of the belt 76. As the level of the water 144 within the trough formed by the upper reach 78 of the belt 76 reaches a predetermined height, the float 142 will cause movement of the actuator 140 to close the control valve 138.

Inasmuch as the endless flexible belt 76 is constantly in motion, any droppings which may fall into the water 144 and downwardly through the latter onto the upper reach 78 of the belt 76 will move longitudinally of the guide assembly 16 toward the end of the trough which is disposed within the housing 14. Then, as the belt 76 moves upward to pass over the roller 36, any droppings positioned on the belt will be lifted out of the water 144. Then, as the belt 76 passes over the scrubbing roller 94, all foreign material clinging to the outer surfaces of the belt 76 will be scrubbed therefrom. In addition, as the belt 76 passes about the roller 75, the applicator 134 will apply disinfectant to the outer surfaces of the belt 76 before it passes back into the trough defined by the portion of the upper reach 78 of the belt 76 engaged by the guide assembly 16. Of course, the disinfectant applied by the applicator 134 might become too greatly concentrated within the trough. However, as the belt 76 moves out of the end of the guide assembly 16 disposed within the housing 14, quantities of water cling to the belt 76 and thus water supply in the trough is constantly changed at a slow rate whether poultry drink from the fountain 10 or not. In this manner, the concentration of the disinfactant applied by the applicator 134 within the water 144 in the trough is maintained at a minimum.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A self-cleaning fountain comprising an elongated endless flexible belt entrained over a pair of spaced supports and defining at least one generally horizontally disposed reach, means drivingly engaged with said belt for effecting longitudinal movement thereof relative to and about said supports, guide means disposed for engagement with at least a portion of said one reach and laterally deflecting said portion of said one reach along a plane generally paralleling its longitudinal center line and forming an upwardly opening trough therefrom extending longitudinally of said portion of said one reach adapted to retain liquids therein and having upwardly divergent opposite end portions.

2. The combination of claim 1 wherein said fountain includes belt cleaning means operatively positioned adjacent a portion of the path of travel of said belt for cleaning at least the surfaces of said belt which, when engaged by said guide means, form the inner surfaces of said trough.

3. The combination of claim 1 wherein said fountain includes belt disinfectant means operatively positioned adjacent a portion of the path of travel of said belt for disinfecting at least the surfaces of said belt which, when engaged by said guide means, form the inner surfaces of said trough.

4. The combination of claim 3, said fountain also including belt cleaning means operatively positioned adjacent a portion of the path of travel of said belt for cleaning at least the surfaces of said belt which, when engaged by said guide means, form the inner surfaces of said trough.

5. The combination of claim 1 wherein said pair of spaced supports each comprises a roller journaled for rotation about its longitudinal axis.

6. The combination of claim 1 wherein said fountain includes belt scrubbing means operatively positioned adjacent a portion of the path of travel of said belt scrubbingly engaging at least the surfaces of said belt which, when engaged by said guide means, form the inner surfaces of said trough.

7. The combination of claim 1 wherein said pair of spaced supports each comprises a roller journaled for rotation about its longitudinal axis, means mounting said rollers for adjustable lateral positioning relative to each other whereby the tension of said belt may be adjusted.

8. The combination of claim 1 wherein said pair of spaced supports each comprises a roller journaled for rotation about its longitudinal axis, one of said rollers comprising said drive means and including means adapted to have the power output shaft of a prime mover drivingly connected thereto.

9. The combination of claim 1 including liquid supply means operatively associated with said trough for replenishing the supply of liquid therein, said supply means comprising conduit means having an outlet end with which a control valve is operatively connected, the other end of said conduit means being adapted for connection to a source of liquid under pressure, said control valve including a movable actuator and a float control assembly operatively connected with said actuator for opening said control valve in response to a drop in the liquid level in said trough.

10. The combination of claim 1 wherein said pair of spaced supports each comprises a roller journalled for rotation about its longitudinal axis, means mounting said rollers for adjustable lateral positioning relative to each other whereby the tension of said belt may be adjusted, said fountain including belt disinfectant means operatively positioned adjacent a portion of the path of travel of said belt for disinfecting at least the surfaces of said belt which, when engaged by said guide means, form the inner surfaces of said trough.

11. The combination of claim 10 wherein said fountain includes belt scrubbing means operatively positioned adjacent a portion of the path of travel of said belt scrubbingly engaging at least the surfaces of said belt which, when engaged by said guide means, form the inner surfaces of said trough.

12. The combination of claim 11 wherein said pair of spaced supports each comprises a roller journaled for rotation about its longitudinal axis.

13. The combination of claim 12 and means mounting said rollers for adjustable lateral positioning relative to each other whereby the tension of said belt may be adjusted.

14. The combination of claim 1 including liquid supply means operatively associated with said trough for replenishing the supply of liquid therein.

15. A self-cleaning fountain comprising an elongated endless flexible belt entrained over a pair of spaced supports and defining at least one generally horizontally disposed reach means drivingly engaged with said belt for effecting longitudinal movement thereof relative to and about said supports, guide means disposed for engagement with at least a portion of said one reach and laterally deflecting said portion of said one reach along a plane generally paralleling its longitudinal center line and forming an upwardly opening trough therefrom extending longitudinally of said portion of said one reach adapted to retain liquids therein, and means operatively engaged with the opposite ends of said trough and operative to prevent the flow of liquid outwardly thereof.

References Cited in the file of this patent

UNITED STATES PATENTS

| | | |
|---|---|---|
| 1,190,892 | Hartt | July 11, 1916 |
| 1,472,553 | Schwinger | Aug. 29, 1922 |
| 2,311,640 | Cornell | Feb. 23, 1943 |
| 2,591,609 | Roberts et al. | Apr. 1, 1952 |
| 2,756,721 | Hayes | July 31, 1956 |
| 2,828,717 | Mikkelsen | Apr. 1, 1958 |
| 2,897,954 | Cordis | Aug. 4, 1959 |
| 2,960,965 | Cordis | Nov. 22, 1960 |
| 3,002,494 | Murray | Oct. 3, 1961 |
| 3,109,413 | Patchett | Nov. 5, 1963 |